United States Patent
Lee et al.

(10) Patent No.: US 7,116,523 B2
(45) Date of Patent: *Oct. 3, 2006

(54) INTERCONNECT MODULE FOR USE IN A SUSPENSION ASSEMBLY

(75) Inventors: Francis Chee-Shuen Lee, San Jose, CA (US); Michael Lee McGhee, San Jose, CA (US); Salvador Navarro, San Jose, CA (US); Ullai Vasant Nayak, San Jose, CA (US); Eric Christian O'Brien, Fremont, CA (US); Wing Chun Shum, San Jose, CA (US); Randall George Simmons, San Jose, CA (US)

(73) Assignee: Hitachi Global Storage Technologies Netherlands B.V., Amsterdam (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 208 days.

(21) Appl. No.: 09/219,195

(22) Filed: Dec. 21, 1998

(65) Prior Publication Data
US 2001/0001587 A1   May 24, 2001

(51) Int. Cl.
*G11B 5/48* (2006.01)
(52) U.S. Cl. .................................. 360/245.9
(58) Field of Classification Search ............. 360/104, 360/234, 234.3, 234.4, 234.5, 234.6, 234.7, 360/264.2, 266.3, 271.9, 281.7, 294.3, 294.4, 360/294.5, 294.6, 245.9, 245.8, 294.1, 294.2; 439/55
See application file for complete search history.

(56) References Cited

U.S. PATENT DOCUMENTS

| 4,642,716 A | | 2/1987 | Wakabayashi et al. ....... 360/104 |
| 4,737,872 A | * | 4/1988 | Delacou ................... 360/281.7 |
| 4,789,914 A | | 12/1988 | Ainslie et al. .............. 360/103 |
| 5,305,167 A | | 4/1994 | Nagase et al. .............. 360/104 |
| 5,337,202 A | * | 8/1994 | Jabbari .................... 360/97.01 |
| 5,463,513 A | | 10/1995 | Hoshino ..................... 360/104 |
| 5,598,307 A | | 1/1997 | Bennin ...................... 360/104 |
| 5,657,186 A | * | 8/1997 | Kudo et al. .............. 360/234.5 |
| 5,657,188 A | * | 8/1997 | Jurgenson et al. .......... 360/106 |
| 5,717,547 A | * | 2/1998 | Young ........................ 360/246 |
| 5,781,380 A | * | 7/1998 | Berding et al. .......... 360/264.2 |
| 5,808,834 A | * | 9/1998 | Jurgenson ................ 360/234.5 |
| 5,818,662 A | * | 10/1998 | Shum ......................... 360/104 |

(Continued)

FOREIGN PATENT DOCUMENTS

JP           63-193319           8/1988

OTHER PUBLICATIONS

TDB—vol. 42, No. 3, Jun. 1995—Magnetic Recording Head Positioning at Very High Track Densities Using a Microactuator-Based, Two-Stage Servo System.

*Primary Examiner*—Angel Castro
(74) *Attorney, Agent, or Firm*—Kunzler & Associates (57) ABSTRACT

A lead routing module for interconnecting two devices in a suspension assembly. The suspension assembly including at least a suspension, a slider/head assembly, and a lead routing module. The suspension assembly may also include a microactuator. The lead routing module routes electrical signals between at least two devices in the suspension assembly such that the termination leads and/or pads of each device may be conveniently located. The suspension assembly may be used in a disk drive system, or alternatively, in a disk test system used for testing disks.

26 Claims, 8 Drawing Sheets

U.S. PATENT DOCUMENTS

| | | | |
|---|---|---|---|
| 5,856,896 A * | 1/1999 | Berg et al. .................. 360/104 |
| 5,862,010 A * | 1/1999 | Simmons et al. ........ 360/97.01 |
| 5,867,347 A * | 2/1999 | Knight et al. ............... 360/104 |
| 5,898,544 A * | 4/1999 | Krinke et al. ............... 360/104 |
| 5,930,082 A * | 7/1999 | Arisaka ..................... 360/246.1 |
| 5,943,189 A * | 8/1999 | Boutaghou et al. ...... 360/234.7 |
| 5,959,808 A * | 9/1999 | Fan et al. ................ 360/294.3 |
| 5,982,585 A * | 11/1999 | Fan et al. ................ 360/294.6 |
| 6,002,550 A * | 12/1999 | Amemiya ................ 360/234.5 |
| 6,025,988 A * | 2/2000 | Yan ............................ 361/685 |
| 6,046,882 A * | 4/2000 | Pattanaik et al. ............. 29/878 |
| 6,055,132 A | 4/2000 | Arya et al. ................. 360/104 |
| 6,069,774 A * | 5/2000 | Arisaka et al. .......... 360/245.3 |
| 6,078,473 A * | 6/2000 | Crane et al. ............. 360/294.3 |
| 6,122,149 A * | 9/2000 | Zhang et al. ............ 360/294.5 |
| 6,125,014 A * | 9/2000 | Riedlin, Jr. .............. 360/234.5 |
| 6,181,520 B1 * | 1/2001 | Fukuda .................... 360/244.1 |
| 6,181,531 B1 * | 1/2001 | Koshikawa et al. ..... 360/294.4 |
| 6,233,117 B1 * | 5/2001 | Rancour et al. ......... 360/234.5 |
| 6,246,552 B1 * | 6/2001 | Soeno et al. ............. 360/294.4 |
| 6,268,980 B1 * | 7/2001 | Shiraishi et al. ......... 360/234.5 |
| 6,275,358 B1 * | 8/2001 | Balakrishnan et al. ... 360/264.2 |
| 6,278,585 B1 * | 8/2001 | Olson et al. ............. 360/264.2 |

* cited by examiner

INTERCONNECT MODULE FOR USE IN A SUSPENSION ASSEMBLY

BACKGROUND OF THE INVENTION

1. Field of the Invention

The present invention generally relates to magnetic storage systems, and more particularly, to suspension assemblies that include a lead routing module.

2. Description of Prior Art

Direct access storage devices (DASD), or disk drives, store information on concentric tracks of one or more rotatable magnetic recording disks. A magnetic head or transducer element is moved from track to track to record and read the desired information. Typically, the magnetic head is positioned on an air bearing slider to form a slider/head assembly which flies above the surface of the disk as the disk rotates. A suspension supports the slider/head assembly and couples the slider/head assembly to a linear or rotary actuator. The combination of the suspension and slider/head assembly may be referred to as a suspension assembly or head gimbal assembly. In general, a rotary actuator moves the slider/head assembly above the disk surface in a generally arcuate path along the radius of the disk surface, whereas a linear actuator moves the slider/head assembly above the disk surface in a generally linear path along the radius of the disk surface.

Figure 1:
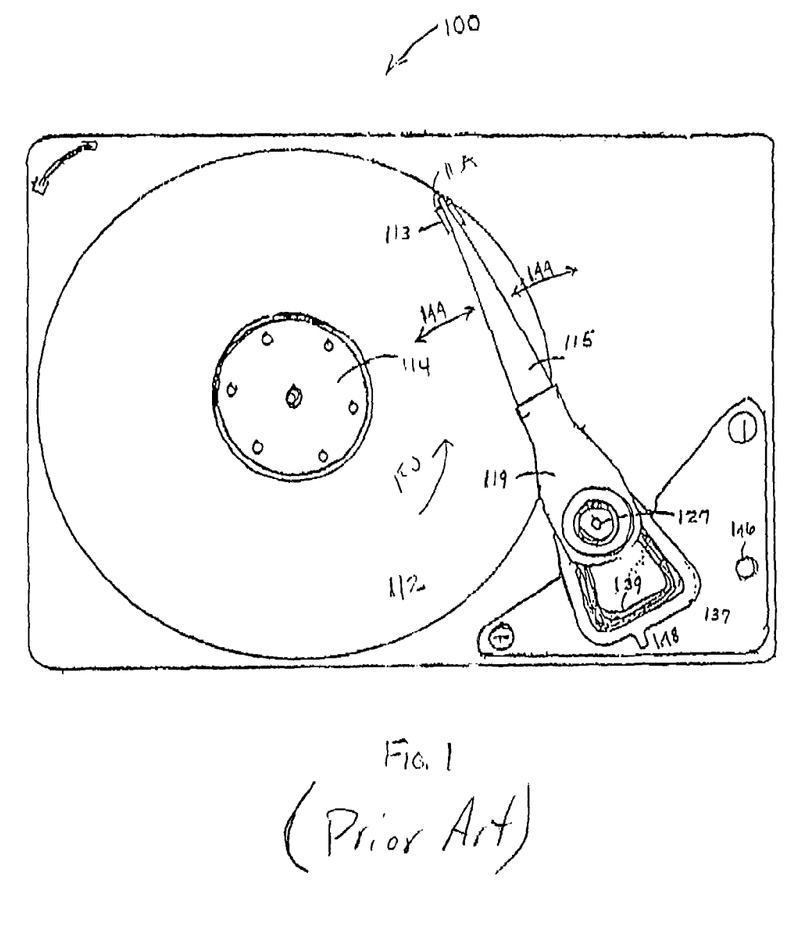
FIG. 1 illustrates the translational motion of a suspension assembly when positioned by a rotary actuator.

Many conventional disk drive systems today use a rotary actuator to position a slider/head assembly. For example, FIG. 1 illustrates the translational motion of a slider/head assembly 113 with respect to a disk 112 when positioned by a rotatory actuator 119. The actuator 119 is coupled to slider/head 113 via a suspension 115. During data access operations, disk 112 rotates in the direction indicated by arrow 150 and actuator 119 selectively positions slider/head assembly 113 over disk 112 in response to control signals from a servo electronics (not shown).

The actuator 119 rotates about an axis 127 in the directions indicated by arrows 144. A voice coil 139 is provided at one end of actuator 119 between two pairs of permanent magnets, one of which is shown by reference numeral 137. The outer magnet is attached to the inner side of disk drive system 100. The control signal from the servo control electronics causes a current to flow in voice coil 139 and to generate a magnetic flux. The flux creates force in either direction parallel to the surface of the permanent magnets 137, causing actuator 119 to move in a desired direction. Actuator movement is limited by one or more crash stops 146 that block the range of movement of a protrusion 148. Thus, rotary actuator 119 moves slider/head assembly 113 above the disk surface in a generally arcuate path along the radius of disk 112.

The translational motion of rotary actuator 119 requires in-line mounting of slider/head assembly 113 to suspension 115. For in-line mounting, the head termination pads of the read/write elements located at the trailing end 113A of slider/head assembly 113 are mounted in-line or parallel with suspension 115.

During manufacturing when a disk is tested, one or more testers or test platforms may use a linear actuator, as compared to a rotary actuator, to position a slider/head assembly over the disk. The physical constraints of the test equipment often requires the use of a linear actuator. Unlike rotary actuators, linear actuators require the read/write termination pads located at the trailing end of the slider/head assembly to be mounted orthogonally rather than in-line to the suspension.

Figure 2:
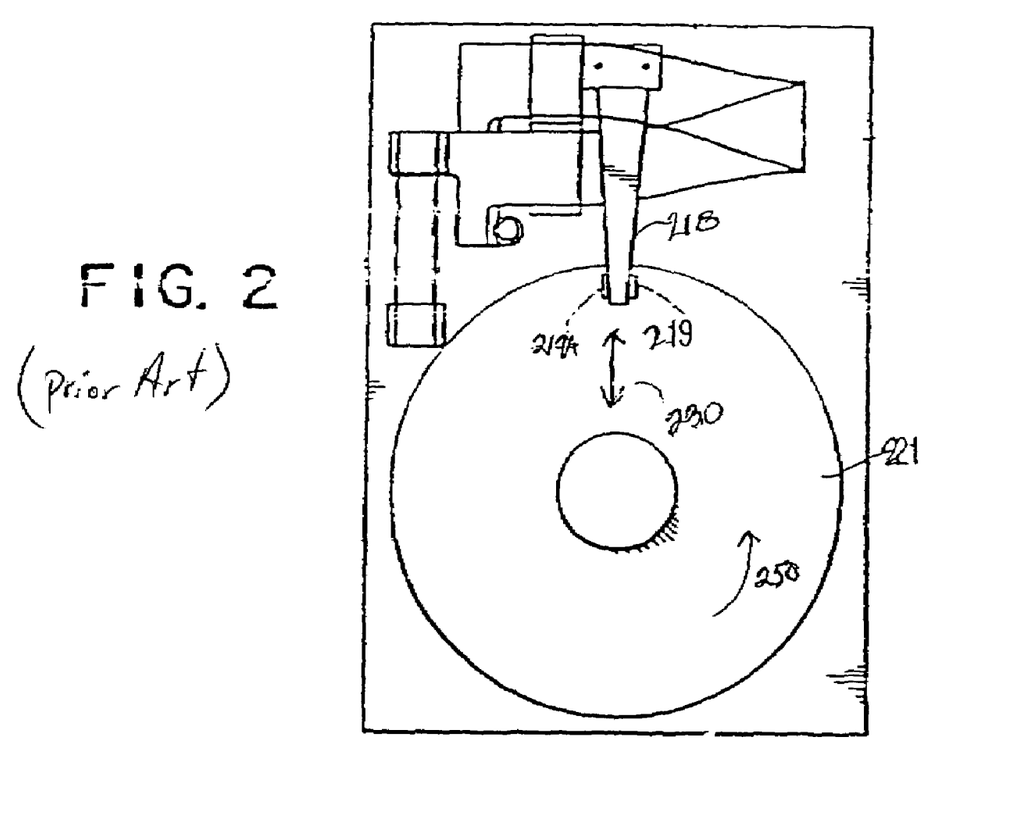
FIG. 2 illustrates the translational motion of a suspension assembly when positioned by a linear actuator.

FIG. 2 illustrates the relative motion of a suspension assembly with respect to a disk surface when the suspension assembly is positioned by a linear actuator. A slider/head assembly 219 is suspended from a suspension 218. The combination of slider/head assembly 219 and suspension 218 is referred to as a suspension assembly or head gimbal assembly. During data access operations, the suspension assembly is designed to move in a linear translational motion above the surface of a disk 221 as disk 221 is spinning in the direction indicated by arrow 250. The linear translational motion is shown by arrow 230.

As hard disk drives become smaller in size and as their recording track density increases, smaller suspensions are often necessary. Many conventional suspensions are often referred to as "wired suspensions" because individual wires are strung along the suspension and attached to a slider/head assembly. Often the smaller sized suspensions makes it more difficult to string individual wires along the suspension to the head. As a result, there is an industry trend towards integrated lead suspensions in which electrical leads are etched directly into the suspension rather than stringing separate wires.

Integrated lead suspensions generally provide better control of the flying height of a slider/head assembly. However, by integrating the leads into the suspension, the orientation of the wires cannot be changed without redesigning the suspension. It is not an easy task to redesign an integrated lead suspension because it not only needs to be designed with a careful layout of the electrical leads to provide a transmission line for the electrical signals but also needs to provide good mechanical "balance" to properly support the slider/head assembly flying under the influence of air-bearing forces and mechanical forces that occur during high speed access operations. Thus, when the disk testers or platforms require the leads to be configured for orthogonal mounting, a dedicated test suspension may be required for testing, particularly when using an integrated lead suspension. Often it is not economical to design and build the small quantity of these dedicated test suspensions required for testing.

Additionally, as the track densities of hard disk drives increase, it may be advantageous to provide a two-stage servo system that includes both coarse and fine positioning. Generally, the coarse positioning is performed by the conventional actuator such as linear or rotary actuator, and the fine positioning is accomplished by a separate device referred to as a microactuator. The microactuator may be a device coupled between the suspension and slider/head assembly. However, the size and design constraints of a microactuator may not make it feasible to place its termination pads in a location convenient and/or efficient for attachment to the suspension wires.

SUMMARY OF THE INVENTION

It is desirable to provide a lead routing module to electrically interconnect a suspension and a device such that the termination pads of the device may be conveniently located.

It is also desirable to adapt a suspension designed for use in a disk drive product for use in a disk test system and vice versa.

It is further desirable to reconfigure an integrated lead suspension designed for in-line mounting to orthogonal mounting.

Another desire is to provide a lead routing module to electrically interconnect a suspension and a microactuator such that the termination leads of the suspension can be designed to have minimal impact on the mechanical balance of the suspension and the termination pads on the microactuator can be conveniently located without impacting the performance of the microactuator.

Additionally, it is desirable to provide multiple layers of interconnect modules to support complex wiring schemes.

A lead routing module for routing one or more signals between two devices in a suspension assembly is described. The lead routing module includes a nonconducting body made from an insulating material. Positioned on the nonconducting body are first and second sets of electrical contact regions. One or more conducting leads are coupled between the first and second sets of electrical contact regions for routing the signals between the first and second sets of electrical contact regions.

A suspension assembly is also described. The suspension assembly includes a slider/head assembly, a suspension, and an interconnect module. The slider/head assembly includes at least one transducer configured to read data signals from a disk and write data signals to the disk. The interconnect module is coupled between the suspension and the slider/head assembly and routes the data signals between the suspension and the slider/head assembly. For one embodiment of the present invention, this suspension assembly may be used in a disk drive product, and for alternative embodiments of the present invention, this suspension assembly may be used in a disk test system.

Another suspension assembly is also described. The suspension assembly includes a suspension, a microactuator, and an interconnect module. The interconnect module is coupled between the suspension and microactuator for routing data signals between the suspension and the microactuator. For one embodiment of the present invention, this suspension assembly may be used in a disk drive product, and for alternative embodiments of the present invention, this suspension assembly may be used in a disk test system.

Other desires, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which:

FIGS. 8A–C illustrate a lead routing module according to one embodiment of the present invention.

DESCRIPTION OF THE PREFERRED EMBODIMENTS

The present invention provides a lead routing module for routing the electrical signals between two devices in a suspension assembly.

For one embodiment of the present invention, the lead routing module may be used to interconnect a suspension and a slider/head assembly to form a suspension assembly. The suspension assembly may be used in a disk tester during the manufacturing of drives, or alternatively, used in a disk drive product. By interconnecting the slider/head assembly and suspension in this manner, the orientation of the termination pads of the slider/head assembly is not restricted by the configuration of the suspension leads. Furthermore, the suspension leads may be configured to have minimal impact on the mechanical balance of the suspension while still providing an effective attachment between the suspension and the slider/head assembly.

For alternative embodiments, the lead routing module of the present invention may be used to interconnect a suspension and another device, such as a microactuator that provides fine positioning of the slider/head assembly to form a suspension assembly. The suspension assembly may be used in a disk tester during the manufacturing of drives, or alternatively, used in a disk drive product. The use of a microactuator often requires that the termination leads from the suspension are attached to the termination pads of the microactuator. The interconnect module allows the microactuator to conveniently place its termination pads while allowing the suspension to position its termination leads where it will have minimal impact on the mechanical balance of the suspension. Generally, the lead routing module allows more effective attachments between two devices in a suspension assembly.

Figure 3:
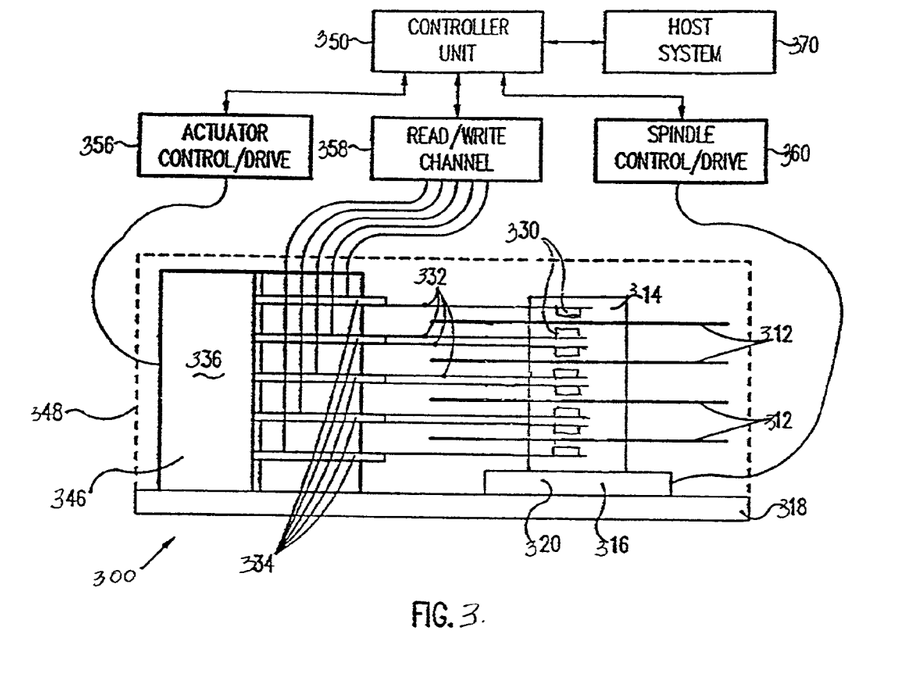
FIGS. 3 and 4 illustrates a data storage system according to one embodiment of the present invention.
Figure 4:
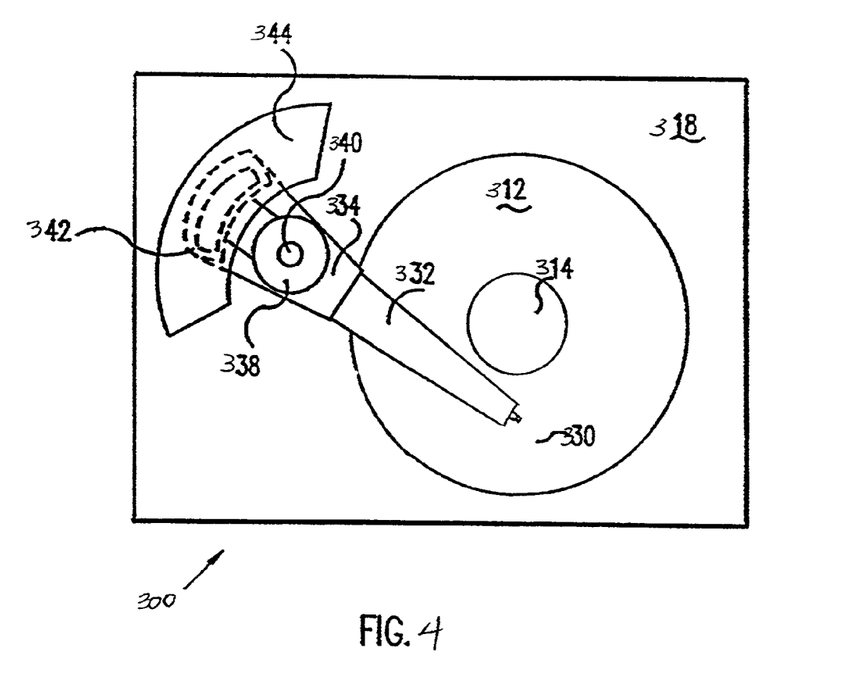

FIGS. 3 and 4 show schematic diagrams of a data storage system according to one embodiment of the present invention. Data storage system 300 comprises a plurality of magnetic recording disks 312 with each disk 312 having a plurality of concentric data tracks. Disks 312 are mounted on a hub 314 of a spindle motor 316. Spindle motor 316 is mounted to a chassis 318. The disks 312 and spindle motor 316 comprise a disk stack assembly 320.

During operation, a plurality of read/write heads 330 are positioned over disks 312 such that each surface of the disks 312 has a corresponding slider/head assembly 330. Each slider/head assembly 330 is attached to one of a plurality of suspensions 332. Each suspension 332 is attached to one of a plurality of actuator arms 334. Arms 334 are connected to a rotary actuator 336. Alternatively, arms 334 may be an integral part of a rotary actuator comb.

During operation, actuator 336 moves the slider/head assemblies 330 in a radial direction across the surface of disks 312. Actuator 336 typically comprises a rotating member 338 mounted to a rotating bearing 340, a motor winding 342, and motor magnets 344. Actuator 336 is also mounted to chassis 318. Although actuator 336 is a rotary actuator, alternative embodiments may use a linear actuator. The slider/head assembly 330, suspension 332, arms 334, and actuator 336 comprise an actuator assembly 346. The disk stack assembly 320 and the actuator assembly 346 are sealed in an enclosure 348 (shown by a dashed line) which provides protection from particulate contamination.

A controller unit 350 provides overall control to system 300. Controller unit 350 typically contains a central processing unit (CPU), memory unit and other digital circuitry.

Controller 350 is connected to an actuator control/drive unit 356 which in turn is connected to actuator 336. This allows controller 350 to control the movement of slider/head assemblies 330 over disks 312. Controller 350 is connected to a spindle control/drive unit 360 which in turn is connected to spindle motor 316. This allows controller 350 to control the rotation of disks 312. A host system 370, which is typically a computer system, is connected to the controller unit 350. System 370 may send digital data to controller 350 to be stored on disks 312, or may request the digital data to be read from disks 312 and sent to the system 370. The read/write channel 358 couples controller unit 350 to slider/head assembly 330.

Figure 5:
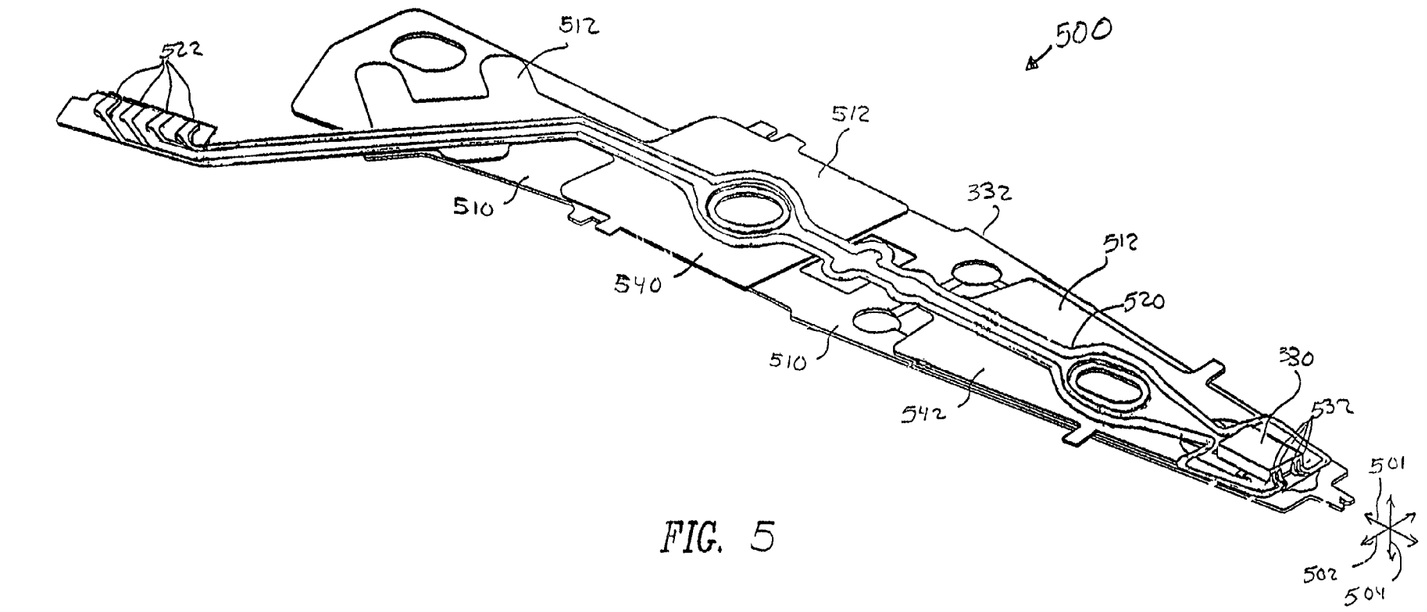
FIG. 5 illustrates an in-line mounting configuration of a suspension assembly according to one embodiment of the present invention.

FIG. 5 shows a perspective view of a slider/head assembly 330 directly attached to a suspension 332 having an in-line configuration. This combination is referred to as a suspension assembly or head gimble assembly (HGA) 500. Although FIG. 5 illustrates that suspension 332 is an integrated lead suspension, the present invention may be extended to various other suspension configurations such as circuit integrated suspensions (CIS), flex on suspensions (FOS) and wired suspensions. Furthermore, the present invention is not limited to suspensions that are configured for in-line mounting and may be extended to suspension configurations for orthogonal mounting. Suspension 332 has a longitudinal axis 501, a lateral axis 502 and a perpendicular axis 504.

Suspension 332 includes a load beam 510 and a layered member 512. Layered member 512 is formed from a multi-layer material. Various layers of member 512 are etched away in a photolithographic process to form the desired shapes.

The suspension assembly 500 can be extremely small. The distance from the end of actuator arm 334 to the end of suspension 332 is typically on the order of 15 to 7 millimeters (mm) or less. One embodiment of the slider/head 330 may have the dimensions of 1.25 mm×1.0 mm×0.3 mm.

The layered member 512 may have an electrical lead layer, electrical insulating layer, and support layer. The electrical lead and electrical insulating layers are etched to form electrical lines (or leads) 520 which run from the rear termination pad area 522 to the slider/head assembly 330. Suspension 332 is configured for in-line mounting.

The slider/head assembly 330 includes a slider and transducer located at the trailing end of the slider. The electrical lines 520 terminate and are electrically attached to the slider/head assembly 330 at the head termination pads 532 located at the trailing end of the slider. The electrical lines 520 may be bent vertically upward at the head termination pads 532. Thus, the head termination pads 532 are mounted in-line with the longitudinal axis of suspension 332.

The support layer at laminated member 512 is formed into a rear member 540 and a flexure member 542, which are welded onto load beam 510. Rear member 540 is attached to actuator arms 334 by an adhesive or welding process.

Flexure member 542 provides a gimbal mount for attachment of the slider/head assembly 330. The gimbal mount allows the slider/head assembly 330 to pivot in order to adjust its orientation (static attitude) to achieve the proper air bearing between the slider/head assembly 330 and disk 312 while the disk 312 is rotating. The rear member 540, flexure 542, and load beam 510 also serve the purpose of providing support for the electrical lines 520, among other purposes such as providing stiffness balance and an area for bonding or welding.

It is often advantageous to use the same suspension design, or a very similar suspension design, for both the disk drive system and the disk test system, particularly when using an integrated lead suspension. Integrated lead suspensions provide various advantages over the conventional wired suspensions when incorporated into disk drive systems. As smaller slider/head assemblies are used in disk drives, the moments exerted on the slider/head assembly caused by the suspension have a greater effect on the flying height of the slider/head assembly. In general, the slider/head assembly will not fly correctly unless all the residual moments caused by pitch and roll static attitudes of the slider/head assembly are controlled. When the slider/head assembly is mounted on an integrated lead suspension, the integrated lead suspension minimizes the residual moments and provides for a more controlled flying height over the conventional wired suspensions by way of tight manufacturing control. Furthermore, when integrated lead suspensions are incorporated into disk tests systems, they also provide for tighter control over the conventional wired suspensions.

However, an integrated lead suspension designed for use in the disk drive system may need to be adapted for use in a disk test system. For example, the disk drive system may use a rotary actuator and therefore configured for in-line mounting; but the disk test system may use a linear actuator and therefore configured for orthogonal mounting. Unlike wired suspensions, the mounting configuration of integrated head suspensions cannot be easily altered because the leads are integrally formed within the suspension. Therefore, the integrated lead suspension needs to be redesigned to change the routing of the leads. Often it is not cost efficient to design and build small quantities of a dedicated test suspension for the disk testing system. A more viable solution is to adapt the product suspension to be used in the disk testing system.

During the manufacturing of disk drives, typically one or more tests are performed on each disk. Each test may be performed by an individual disk test system, or multiple tests may be performed by individual platforms or stages incorporated into a single disk test system. For example, a conventional disk test system may include a platform for performing a glide height test for testing the roughness of the disk surface, a platform for performing magnetic tests for testing the magnetic properties of the disk, and/or a platform for performing a disk flatness test for measuring the flatness of the disk. Additionally, the disk test system may perform procedures such as disk burnishing for removing localized disk asperities or tape burnishing for smoothing the disk surface with an abrasive tape.

Figure 6:
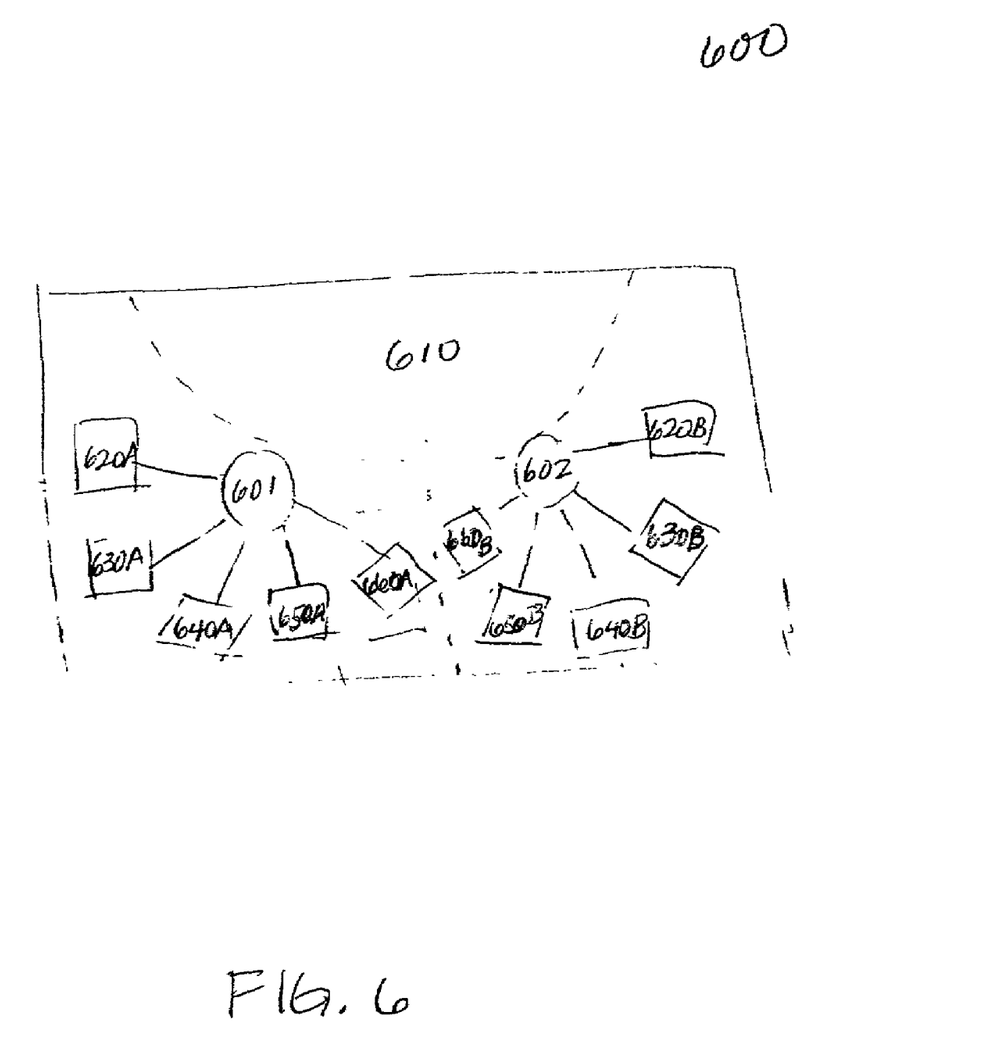
FIG. 6 illustrates a disk tester according to one embodiment of the present invention.

FIG. 6 illustrates a top view of one embodiment of a disk test system according to the present invention. Alternative embodiments may not include all of the test platforms shown in FIG. 6 or may include additional platforms not shown in FIG. 6. The disk test system 600 includes two spindles 601 and 602 for rotating the disks to be tested. A robot mechanism (not shown) is used to place the disks on the spindles and typically requires approximately 120 to 150 degrees of empty space to access the spindles. The empty space 610 is provided for robot access to the spindles. Disk test system 600 includes multiple platforms where platforms 620A and 620B represent the disk flatness test stage; platforms 630A and 630B represent the glide height test stage; platforms 640A and 640B represent the burnish stage; platforms 650A and 650B represent the tape burnish stage; and platforms 660A and 660B represent the magnetic test stage.

Today, many disk drive manufacturers find it advantageous to incorporate as many tests as possible into a single disk test system to reduce the through-put test time for each disk. However, the number of test platforms are often physically constrained by the size of the disk and the geometries of the test equipment and the mechanisms used to access the disk surface.

The glide height test is one means of assuring a substantially asperity-free disk surface. During the glide height test, the roughness of the disk surface is measured by flying slider over the recording surface at a height equal to or below the desired data head flying height to analyze impacts between the slider and the disk surface. The slider includes one or more piezoelectric sensors bonded to an upper surface facing away from the recording surface. As the slider experiences rigid body displacement and flexural deformation, the adjacent sensor responds by generating a charge signal which may be monitored. Thus, the modulation of the slider flying height corresponds to the roughness of the disk surface. Often, a dedicated test suspension is used to support the slider used for glide testing. For alternative embodiments, a suspension similar or identical to the product suspension may be used.

Magnetic tests are used for testing the uniformity of the magnetic signal amplitude and for missing bits. Generally, the magnetic tester or platform includes a slider/head assembly that is the same or very similar to the product slider/head assembly, and also includes a suspension that is the same or very similar to the product suspension.

The various test platforms may require the use of a linear actuator although the actual disk drive uses a rotary actuator. As stated above, rotary actuators typically require suspensions that are configured for in-line mounting and linear actuators typically require suspensions that are configured for orthogonal mounting. Thus, when the product suspension, or a similar suspension, which is designed to operate with a rotary actuator, is incorporated into a disk test platform that uses a linear actuator, the leads must be adapted for orthogonal mounting. This may be accomplished by the use of a lead routing module for interconnecting a suspension to a slider/head assembly, or some other device.

Figure 7:
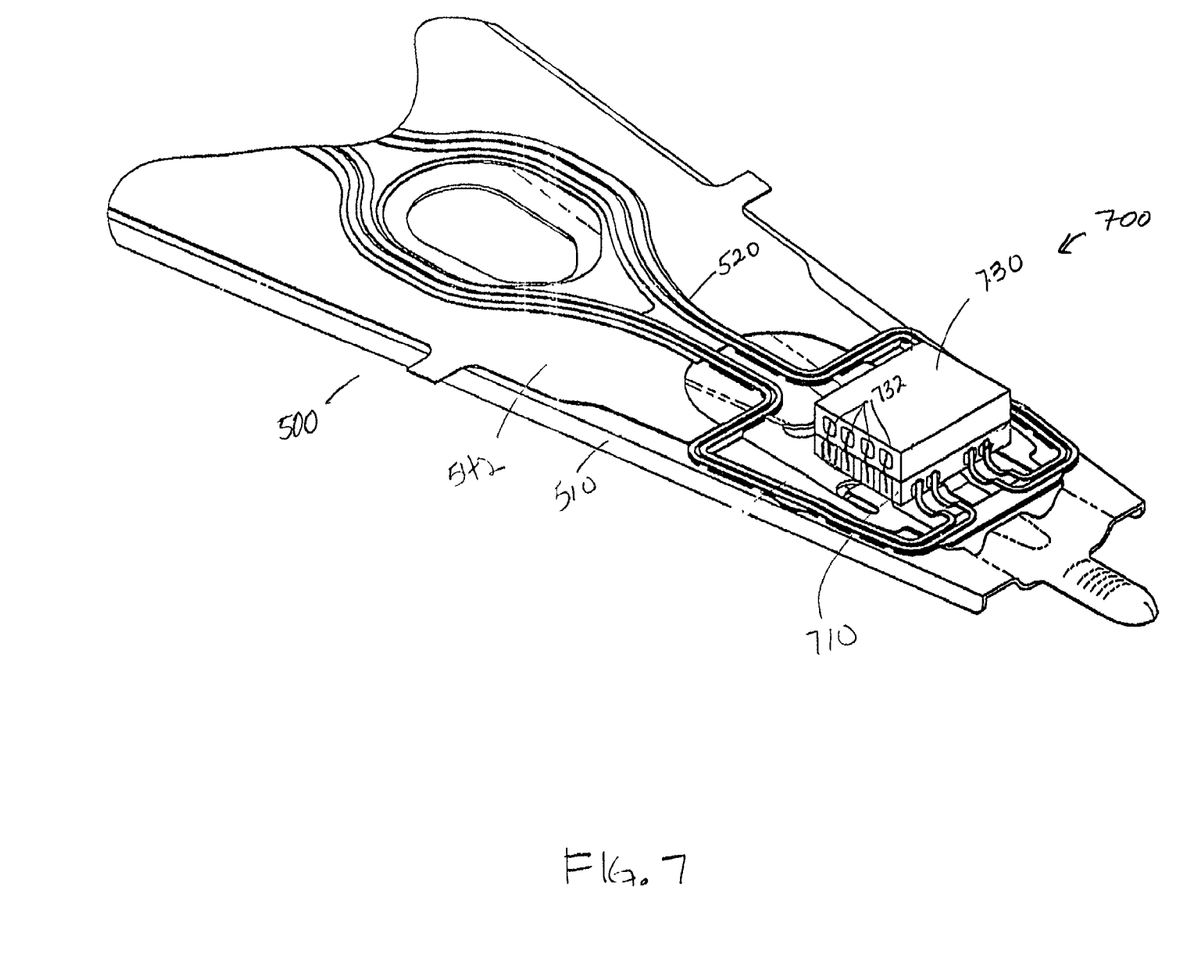
FIG. 7 illustrates a suspension assembly that includes a lead routing module in accordance with one embodiment of the present invention.

FIG. 7 illustrates one embodiment of a suspension configured for in-line mounting of a slider/head assembly but is adapted for orthogonal-mounting of a slider/head assembly in accordance with the present invention. The suspension assembly 700, which includes a slider 730, a lead routing module 710 and a suspension 500, may be used in either a disk test system or a disk drive system. As mentioned above, suspension 500 is an integrated lead suspension having termination leads 520 configured for in-line mounting. However, slider/head assembly 730 is configured for orthogonal mounting with suspension 500 which is typically required when the positioning mechanism is a linear actuator. The head termination pads 732 of slider/head assembly are orthogonal to the termination leads 520 of suspension 500.

Interconnecting suspension 500 and slider 730 is a lead routing module 710. The lead routing module 710 routes the electrical signals between the head termination pads 732 of slider/head assembly 730 and the termination leads 520 of suspension 500 such that suspension 500 may be adapted for orthogonal mounting. For one embodiment, lead routing module 710 may be approximately 1 mm×1.25 mm×190 microns (μm), which is approximately the same size as slider/head assembly 730. However, when using lead routing module 710 to interconnect slider/head assembly 730 to suspension 500, it is not required that the lead routing module be substantially the same size as the slider/head assembly.

As shown in FIG. 7, the head termination pads 732 are attached via wire bonding to a first set of electrical contact regions on lead routing module 710, and the termination leads 520 of suspension 500 are attached via a direct link of bent leads to a second set of electrical contact regions on lead routing module 710. Coupled between the first and second sets of electrical regions are conductive lines or leads (not shown). The electrically conducting lines trace a path on top or through lead routing module 710. The first and/or second set of electrical contact regions may be referred to as bonding pads. Furthermore, the first and/or second set of electrical contact regions may be positioned on a side surface of module 710, or a top or bottom surface of module 710. For this embodiment of module 710, the first set of electrical contact regions and the second set of electrical contact regions are positioned orthogonally. For alternative embodiments, the first and second set of electrical contact regions are 180 degrees apart. In general, the lead routing module 710 interconnects two devices (e.g., suspension 580 and slider/head assembly 730) and the positioning of the first and second sets of electrical contact regions depend on the orientation of the termination pads/wires in the first and second devices.

The lead routing module is particularly well suited to interconnect a slider/head assembly that supports a pico-sized MR head and an integrated lead suspension. For one embodiment the lead routing module has the dimensions of 1 mm×1.25 mm×190 μm. Generally, pico-sized sliders are on the order of 1 mm×1.25 mm×0.3 mm and the pico-sized MR heads are sized accordingly. One advantage of using an interconnect module in this case is that redesign of the integrated lead suspension is not needed during testing although the head termination pads are rotated 90 degrees from the in-line mounting position. However, the lead routing module of the present invention may be used to interconnect various other devices other than suspensions and slider/head assemblies.

Figure 8A:
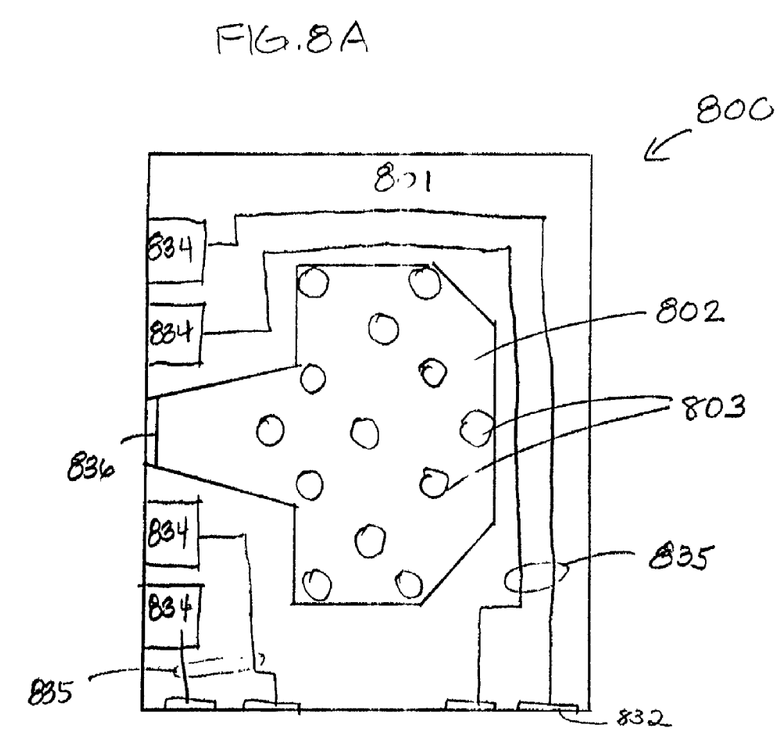
Figure 8B:
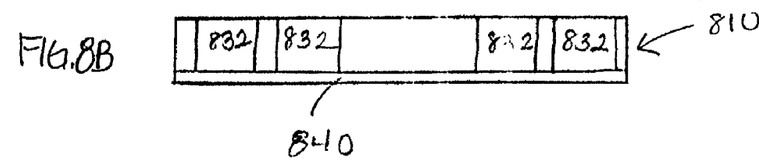
Figure 8C:
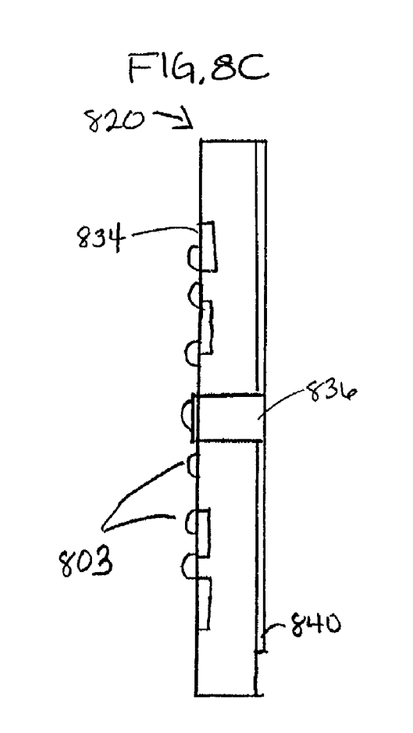

FIGS. 8A–C illustrate one embodiment of a lead routing module according to the present invention. More specifically, FIG. 8 illustrates a top view 800 of a lead routing module and FIGS. 8B and 8C illustrate side views 810 and 820, respectively, of the lead routing module. Generally, the top view 800 of the lead routing module refers to the surface of lead routing module that attaches to the suspension flexure. As mentioned above, a suspension flexure provides a gimbal mount for attachment to a slider/head assembly.

For one embodiment, the lead routing module includes an insulating region 801 made from an insulating material such as a ceramic substrate. Formed on insulating region 801 and shown in FIG. 8A is a conducting central region 802, which includes a plurality of solder balls 803. Typically, the plurality of solder balls are glued to the flexure of the suspension. The solder balls 803 may be solder bumps or plated bumps that are raised approximately 30–50 microns above the top surface 800 to separate the suspension flexure from making electrical contact with a plurality of conducting lines 835. The plurality of conducting leads 835 are formed on top surface 800 external to the central conducting region 802. For alternative embodiments, the conducting leads or lines may be formed partially or fully within the lead routing module.

FIGS. 8A–C illustrate two sets of electrical contact regions 832 and 834, also referred to as bonding pads, which are interconnected via the plurality of conducting leads or lines 835 formed on top surface 800. The first set of bonding pads 832 is generally formed on the side surface 810 adjacent to the head termination pads on the slider/head assembly. Contact between the first set of bonding pads 832 and the head termination pads can be made by wire bonds. The second set of bonding pads 834 is generally formed flush with the top surface 800 such that the termination leads of the suspension terminate on top surface 800. Other termination methods such as solder ball placement and reflow, gold ball bumping, gold wire stitching, solder wire bumping, ultrasonic methods and etc. may be used for attachment. For alternative embodiments the first set of bonding pads 832 may also be formed on top surface 800 and/or the second set of bonding pads 834 may be formed on side surface 820. The bonding pads are typically flush with either the top surface 800, or one of the side surfaces 810 or 820. The routing provided by the lead routing module of the present invention may reduce the size requirements of the head termination pads. Accordingly, the slider may be made thinner and therefore increase the yield of sliders per wafer.

For one embodiment, the first set of bonding pads 832 is attached to the head termination pads on a slider/head assembly. For alternative embodiments, the first set of bonding pads 832 may be attached to some other device, such as a microactuator. Furthermore, the second set of bonding pads 834 is attached to the termination leads of the suspension, which may be configured for in-line mounting. For alternative embodiments, the second set of bonding pads 834 may be attached to some other device. Although FIGS. 8A–C illustrate that the first and second sets of bonding pads have an orthogonal relationship (i.e., positioned 90 degrees apart), an orthogonal relationship is not required for the present invention. For example, the first and second sets of bonding pads 832 and 834 may be positioned 180 degrees apart, depending on the desired bonding pad locations of the two devices being interconnected. Although the first and second sets of bonding pads 832 and 834, respectively, illustrate four bonding pads, the number of bonding pads in each set may vary for alternative embodiments.

Portions of the bottom surface of the lead routing module are shown by side views 810 and 820. When the lead routing module is used to interconnect a slider/head assembly and a suspension, the bottom surface is typically attached to the slider/head assembly. For one embodiment, the bottom surface 840 of the lead routing module includes a solid electrode plate that covers substantially all of the bottom surface 840. Typically, the electrode is glued to the slider/head assembly. Because the slider/head assembly typically includes an MR head, the slider/head assembly needs to be grounded to prevent charge build-up. Thus, grounding may be accomplished by routing charge from the MR head to the electrode plate, through a side-wrapping electrode 836 to the central conductive region 802, which is attached to the suspension. For alternative embodiments, the side-wrapping electrode 836 may be replaced with a via hole extending between the top and bottom surfaces, that is gold plated to operate as a conductor.

A trend in the disk drive industry is that the storage capacities and areal densities of disk drives continue to increase. As a result, the magnetic bit size which may be reliably written and read continues to decrease. Accordingly, data is recorded in ever-narrowing tracks which must be followed with extreme precision. In order to achieve increased track densities, for example 25,000 tracks/in, a two-stage servo system may be necessary. The two-stage servo system typically includes a high bandwidth microactuator for rapid position corrections of the recording head, coupled with a conventional actuator, such as the rotary or linear actuators described above.

In general microactuators are electrostatically-driven, or electroplated polysilicon microstructures, normally 10 or 40 microns thick. The microactuator may include a movable plate connected to a substrate by springs. Positioned on the substrate may be two sets of mating interdigitated electrodes which activate motion of the plate in opposing directions. The electrode layout may be such that one or more masking levels is needed to define the electrode sets that can generate position-independent electrostatic force in both direction. A bonding platform may be formed above the moving electrodes which structurally attach to a rigid plate as a top cover. Typically, the slider/head assembly is attached to that rigid plate. For a better understanding of a two-stage servo system, refer to the article written by Long-Sheng Fan et al. entitled "Magnetic Recording Head Positioning at Very High Track Densities Using a Microactuator-Based, Two Stage Servo System" (IEEE Transaction on Industrial Electronics, Vol. 42, No. 3, P. 222–233, June 1995) which is incorporated herein by reference in its entirety.

Typically, when fabricating microactuators, the locations for placing the termination pads or leads is limited by the size of the microactuator and the various circuits and components within the microactuator. As such, it is often inconvenient or impossible to route the traces from the suspension for mating with the microactuator. Thus, it is desirable or often necessary to interconnect the suspension and the microactuator with an interconnect module.

Figure 9:
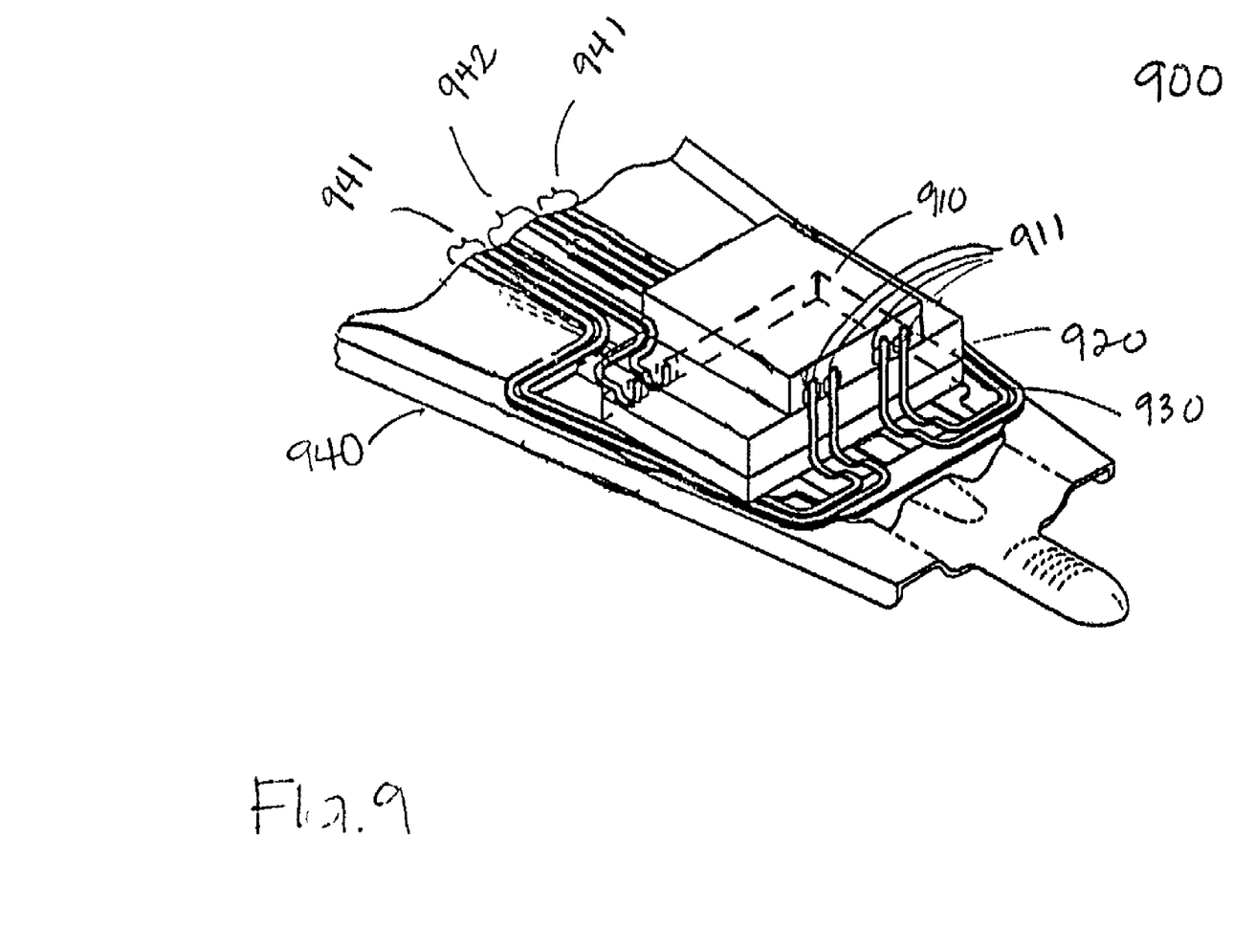
FIG. 9 illustrates a suspension assembly that includes a lead routing module and a microactuator chip in accordance with one embodiment of the present invention.

FIG. 9 illustrates a portion of one embodiment of a suspension assembly according to the present invention. The suspension assembly 900 includes a suspension 940 configured for in-line mounting, a lead routing module 930, a microactuator chip 920, and a slider 910. A typical suspension used in suspension assembly 900 requires that suspension 940 have 8 electrical leads or terminating leads that need to be routed and terminated. A first set of the leads 941 may be attached to the MR read/write elements via head termination pads 911. The first set of leads 941 may be attached using bent lead termination. The second set of leads 942 are for attachment to microacuator 920. Various methods of attachments such as solder ball placement and reflow, gold ball bumping, gold wire stitching, solder wire bumping, ultrasonic bonding, or other methods of termination may be used. The lead routing module 930 is used to interconnect suspension 940 and microactuator 920. Although, FIG. 9 illustrates that lead routing module 930 is positioned between suspension 940 and microactuator 920, for alternative embodiments, lead routing module 930 may be positioned between microactuator 920 and slider/head assembly 910.

As shown in FIG. 9, the second set of leads 942 of suspension 940 terminates at and attaches to lead routing module 930 at a first set of electrical contact regions. The lead routing module 930 also includes a second set of electrical contact regions (not shown) that is coupled to microactuator 920. In general, the location of the second set of electrical contact regions is determined by the desired attachment location of microactuator 920. The first and second sets of electrical contact regions may include bonding pads or solder plated regions. Coupling the first and second sets of electrical contact regions is a plurality of conducting leads or lines (not shown). Although the first and second sets of electrical contact regions may be located orthogonal or 180 degrees the present invention is not limited to these orientations.

The lead routing module generally consists of a ceramic substrate with two sets of electrical contact regions and electrically conducting lines. The lead routing module allows the interconnected devices to place their terminations pads or leads at its optimal location while providing an efficient attachments between the two devices. For additional embodiments, multiple layers of interconnect modules may be used to provide more complex wiring schemes that can provide shielding or other optimizations of electrical or mechanical characteristics of a suspension assembly.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A disk drive system, comprising:
  a microactuator having a connecting end;
  a slider/head assembly position d on th microactuator;
  a suspension having a connecting end and electrically conducting paths; and
  an interconnect module positioned between the suspension and the microactuator, the interconnect module coupling the connected end of the suspension and the connected end of the microactuator such that the connected end of the suspension is positioned in a first direction and the connecting end of the microactuator is positioned in a second direction.

2. The disk drive system of claim 1, wherein said suspension is an integrated lead suspension.

3. The disk drive system of claim 1, wherein said slider/head assembly is orthogonally mounted onto said suspension.

4. The suspension assembly of claim 1, wherein said electrically conducting paths are attached to said suspension.

5. A suspension assembly comprising:
  a slider/head assembly;
  a suspension having a connecting end and electrically conducting paths;
  a microactuator having a connecting end; and
  an interconnect module coupling the connecting ends of the suspension and the microactuator to route one or more data signals between said electrically conducting paths and said microactuator, such that the connecting end of the suspension is positioned in a first direction and the connecting end of the microactuator is positioned in a second direction.

6. The suspension assembly of claim 5, wherein said suspension is an integrated lead suspension.

7. The suspension assembly of claim 5, wherein said suspension includes a first set of termination leads coupled to said slider/head assembly and a second set of termination leads coupled to said interconnect module.

8. The suspension assembly of claim 5, wherein said electrically conducting paths are attached to said suspension.

9. An assembly, comprising:
  a first device;
  a second device; and
  an interconnect device coupled between said first and second devices to route one or more signals between said first and second devices,
  wherein said first device is a microactuator and said second device is a suspension.

10. The assembly of claim 9, wherein said electrically conducting paths are attached to said second device.

11. A storage device, comprising:
  a disk;
  a spindle motor positioned to support and rotate said disk;
  a suspension assembly including an interconnect module coupled between a slider/head assembly and a suspension, said suspension having electrically conducting paths, and said interconnect module routing one or more data signals between said electrically conducting paths and said slider/head assembly; and
  a microactuator coupled to said suspension assembly and operable to position said suspension assembly above said disk to access said disk for reading and/or writing operations.

12. The suspension assembly of claim 1, wherein said suspension is an integrated lead suspension.

13. A test system for disks, comprising:
  a spindle motor for rotating a disk during a test operation; and
  a test platform including a suspension assembly coupled to an actuator, said actuator operable to position said suspension assembly above said disk to access said disk for said test operation, said suspension assembly including an interconnect module coupled between a slider/head assembly having a connecting end and a suspension, said suspension having a connecting end and electrically conducting paths, and said interconnect module coupling the connecting ends of the slider/head assembly and the suspension and routing one or more data signals between said electrically conducting paths and said slider/head assembly, such that the connecting end of the suspension is positioned in a first direction and the connecting end of the slider/head assembly is positioned in a second direction.

14. The test system of claim 13, wherein said suspension is an integrated lead suspension.

15. The test system of claim 13, wherein said suspension is configured for inline mounting of said slider/head assembly.

16. The test system of claim 15, wherein said slider/head assembly is orthogonally mounted on said suspension.

17. The test system of claim 14, wherein said electrically conducting paths are attached to said suspension.

18. A storage device, comprising:
  a disk;
  a spindle motor positioned to support and rotate said disk;
  a suspension assembly including an interconnect module coupled between a suspension having a connecting end and electrically conducting paths and a microactuator having a connecting end, the interconnect module coupling the connecting ends of the suspension and the microactuator and routing data signals between said electrically conducting paths and said microactuator, such that the connecting end of the suspension is positioned in a first direction and the connecting end of the microactuator is positioned in a second direction; and
  an actuator coupled to said suspension assembly and operable to position said suspension assembly above said disk to access said disk for reading and/or writing operations.

19. The storage device of claim 18, wherein said suspension is an integrated lead suspension.

20. The storage device of claim 18, wherein said suspension is configured for in-line mounting of a slider/head assembly.

21. The storage device of claim 18, wherein said electrically conducting paths are attached to said suspension.

22. A test system for disks, comprising:
  a spindle motor for rotating a disk during a test operation; and a test platform including a suspension assembly coupled to an actuator, said actuator operable to position said suspension assembly above said disk to access said disk for said test operation, said suspension assembly including an interconnect module coupled between a suspension having a connecting end and electrically conducting paths and a microactuator having a connecting end, the interconnect module coupling the connecting ends of the suspension and the microactuator and routing data signals between said electrically conducting paths and said microactuator, such that the connecting end of the suspension is positioned in a first direction and the connecting end of the microactuator is positioned in a second direction.

23. The test system of claim 22, wherein said suspension is an integrated lead suspension.

24. The test system of claim 22, wherein said suspension is configured for in-line mounting of a slider/head assembly.

25. The test system of claim 24, wherein said microactuator is orthogonally mounted onto said suspension.

26. The test system of claim 22, wherein said electrically conducting paths are attached to said suspension.

* * * * *